(12) United States Patent
Basu Mallick et al.

(10) Patent No.: US 12,438,645 B2
(45) Date of Patent: Oct. 7, 2025

(54) SIDELINK DATA PACKET ACKNOWLEDGMENT

(71) Applicant: LENOVO (BEIJING) LIMITED, Beijing (CN)

(72) Inventors: Prateek Basu Mallick, Dreieich (DE); Karthikeyan Ganesan, Nauheim (DE); Ravi Kuchibhotla, Chicago, IL (US); Alexander Johann Maria Golitschek Edler von Elbwart, Darmstadt (DE); Xiaodong Yu, Beijing (CN); Hyejung Jung, Northbrook, IL (US); Joachim Loehr, Wiesbaden (DE); Vijay Nangia, Woodridge, IL (US)

(73) Assignee: Lenovo (Beijing) Limited, Beijing (CN)

(*) Notice: Subject to any disclaimer, the term of this patent is extended or adjusted under 35 U.S.C. 154(b) by 496 days.

(21) Appl. No.: 17/280,108

(22) PCT Filed: May 5, 2019

(86) PCT No.: PCT/CN2019/085478
§ 371 (c)(1),
(2) Date: Mar. 25, 2021

(87) PCT Pub. No.: WO2020/223846
PCT Pub. Date: Nov. 12, 2020

(65) Prior Publication Data
US 2022/0006571 A1   Jan. 6, 2022

(51) Int. Cl.
*H04L 1/1812* (2023.01)
*H04L 5/00* (2006.01)
*H04W 72/20* (2023.01)

(52) U.S. Cl.
CPC ......... *H04L 1/1816* (2013.01); *H04L 5/0055* (2013.01); *H04W 72/20* (2023.01)

(58) Field of Classification Search
CPC ..................... H04L 5/0055; H03M 13/095
(Continued)

(56) References Cited

U.S. PATENT DOCUMENTS 10,454,628 B2 * 10/2019 Kela .................. H04L 1/1887
10,735,139 B1 *  8/2020 Goyal ................ H04W 56/001
(Continued)

FOREIGN PATENT DOCUMENTS

CN     108605364 A     9/2018
CN     109328439 A     2/2019
(Continued)

OTHER PUBLICATIONS

International Searching Authority, "Notification of Transmittal of the International Search Report and the Written Opinion of the International Searching Authority, or the Declaration", PCT/CN2019/085478, May 5, 2019, pp. 1-9.
(Continued)

*Primary Examiner* — Mazda Sabouri
(74) *Attorney, Agent, or Firm* — Kunzler Bean & Adamson

(57) ABSTRACT

Apparatuses, methods, and systems are disclosed for sidelink data packet acknowledgment. One method (700) includes receiving (702) an indicator in sidelink control information. The method (700) includes comparing (704) a current value of the indicator to a last known value of the indicator. The method (700) includes, in response to the current value not matching the last known value: flushing (706) a soft buffer; transferring a data packet corresponding to the indicator into the soft buffer; attempting to decode the data packet; in response to successfully decoding the data packet, performing an acknowledgment action; and, in response to unsuccessfully decoding the data packet, performing a non-acknowledgment action.

18 Claims, 11 Drawing Sheets

(58) Field of Classification Search
USPC .................................. 381/311; 370/312, 315
See application file for complete search history.

(56) References Cited

U.S. PATENT DOCUMENTS

| | | | |
|---|---|---|---|
| 2011/0223924 A1* | 9/2011 | Lohr | H04L 1/1607 455/450 |
| 2017/0288820 A1 | 10/2017 | Kela et al. | |
| 2018/0287745 A1 | 10/2018 | Sun et al. | |
| 2019/0052436 A1* | 2/2019 | Desai | H04W 72/0446 |
| 2019/0053267 A1 | 2/2019 | Kim et al. | |
| 2019/0058986 A1* | 2/2019 | Loehr | H04L 1/1825 |
| 2020/0044789 A1* | 2/2020 | Beale | H04L 25/0224 |
| 2021/0194645 A1* | 6/2021 | Li | H04L 1/1845 |
| 2021/0345180 A1* | 11/2021 | Peng | H04W 72/20 |
| 2022/0173839 A1* | 6/2022 | Yoshioka | H04W 4/06 |

FOREIGN PATENT DOCUMENTS

| | | |
|---|---|---|
| CN | 109565771 A | 4/2019 |
| CN | 109691217 A | 4/2019 |
| WO | 2018170823 A1 | 9/2018 |
| WO | 2019077194 A1 | 4/2019 |

OTHER PUBLICATIONS

Qualcomm Incorporated, QoS for NR V2X, 3GPP TSG-RAN WG2 Meeting #105bis, R2-1905196, Apr. 8-12, 2019, pp. 1-5, Xi'an, China.

Qualcomm Incorporated, Physical layer procedures for sidelink, 3GPP TSG RAN WG1 Meeting #96bis, R1-1905012, Apr. 8-12, 2019, pp. 1-14, Xian, China.

3GPP, 3rd Generation Partnetship Project; Techincal Specification Group Radio Access Network; NR; Stuody on Vehicle-to-Everything (Release 16), 3GPP TR 38.885 V2.0.0, Mar. 2019, pp. 1-33.

* cited by examiner

SIDELINK DATA PACKET ACKNOWLEDGMENT

FIELD

The subject matter disclosed herein relates generally to wireless communications and more particularly relates to sidelink data packet acknowledgment.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Backhaul ("BH"), Block Error Rate ("BLER"), Broadcast Multicast ("BM"), Buffer Occupancy ("BO"), Base Station ("BS"), Buffer Status Report ("BSR"), Bandwidth ("BW"), Bandwidth Part ("BWP"), Constant Amplitude Zero Autocorrelation ("CAZAC"), Component Carrier ("CC"), Code Division Multiplexing ("CDM"), Control Element ("CE"), Coordinated Multipoint ("CoMP"), Categories of Requirements ("CoR"), Control Resource Set ("CORESET"), Control Plane ("CP"), CSI-RS Resource Indicator ("CRI"), Cell RNTI ("C-RNTI"), Channel State Information ("CSI"), Channel Quality Indicator ("CQI"), Central Unit ("CU"), Codeword ("CW"), Downlink Assignment Index ("DAI"), Downlink Control Information ("DCI"), Downlink ("DL"), Demodulation Reference Signal ("DMRS" or "DM-RS"), Data Radio Bearer ("DRB"), Dedicated Short-Range Communications ("DSRC"), Discontinuous Transmission ("DTX"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), 450 MHz-6000 MHz ("FR1"), 24250 MHz-52600 MHz ("FR2"), Hybrid Automatic Repeat Request ("HARQ"), Integrated Access Backhaul ("IAB"), Identity or Identifier or Identification ("ID"), Interference Measurement ("IM"), International Mobile Subscriber Identity ("IMSI"), Internet-of-Things ("IoT"), Internet Protocol ("IP"), Joint Transmission ("JT"), Level 1 ("L1"), Level 2 ("L2"), Logical Channel ("LCH"), Logical Channel Group ("LCG"), Logical Channel ID ("LCID"), Logical Channel Prioritization ("LCP"), Long Term Evolution ("LTE"), Levels of Automation ("LoA"), Medium Access Control ("MAC"), Minimum Communication Range ("MCR"), Modulation Coding Scheme ("MCS"), Multiple Input Multiple Output ("MIMO"), Mobile-Termination ("MT"), Machine Type Communication ("MTC"), Multi-User ("MU"), Multi-User MIMO ("MU-MIMO"), Negative-Acknowledgment ("NACK") or ("NAK"), New Data Indicator ("NDI"), Next Generation ("NG"), Next Generation Node B ("gNB"), New Radio ("NR"), Non-Zero Power ("NZP"), Orthogonal Frequency Division Multiplexing ("OFDM"), Peak-to-Average Power Ratio ("PAPR"), Physical Broadcast Channel ("PBCH"), Physical Downlink Control Channel ("PDCCH"), Physical Downlink Shared Channel ("PDSCH"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Feedback Channel ("PSFCH"), Physical Sidelink Shared Channel ("PSSCH"), Phase Tracking RS ("PTRS" or "PT-RS"), Physical Uplink Shared Channel ("PUSCH"), Quasi Co-Located ("QCL"), Quality of Service ("QoS"), Random Access Channel ("RACH"), Radio Access Network ("RAN"), Radio Access Technology ("RAT"), Resource Element ("RE"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Reference Signal ("RS"), Reference Signal Received Power ("RSRP"), Reference Signal Received Quality ("RSRQ"), Receive ("RX"), Secondary Cell ("SCell"), Sidelink Control Information ("SCI"), Sub Carrier Spacing ("SCS"), Service Data Unit ("SDU"), Single Frequency Network ("SFN"), Subscriber Identity Module ("SIM"), Signal-to-Interference and Noise Ratio ("SINR"), Sidelink ("SL"), Sequence Number ("SN"), Scheduling Request ("SR"), SRS Resource Indicator ("SRI"), Sounding Reference Signal ("SRS"), Synchronization Signal ("SS"), SS/PBCH Block ("SSB"), Transport Block ("TB"), Transmission Control Information ("TCI"), Time Division Duplex ("TDD"), Temporary Mobile Subscriber Identity ("TMSI"), Transmitted Precoding Matrix Indicator ("TPMI"), Transmission Reception Point ("TRP"), Transmit ("TX"), User Entity/Equipment (Mobile Terminal) ("UE"), UE that has Failed to receive and decode a data packet successfully ("UE-F"), UE that has received and decoded a data packet Successfully ("UE-S"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Vehicle RNTI ("V-RNTI"), Worldwide Interoperability for Microwave Access ("WiMAX"), and Zero Power ("ZP"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, sidelink communications may be used. In such networks, feedback may indicate whether the sidelink communications are successful.

BRIEF SUMMARY

Methods for sidelink data packet acknowledgment are disclosed. Apparatuses and systems also perform the functions of the apparatus. In one embodiment, the method includes receiving an indicator in sidelink control information. In certain embodiments, the method includes comparing a current value of the indicator to a last known value of the indicator. In some embodiments, the method includes, in response to the current value not matching the last known value: flushing a soft buffer; transferring a data packet corresponding to the indicator into the soft buffer; attempting to decode the data packet; in response to successfully decoding the data packet, performing an acknowledgment action; and, in response to unsuccessfully decoding the data packet, performing a non-acknowledgment action.

An apparatus for sidelink data packet acknowledgment, in one embodiment, includes a receiver that receives an indicator in sidelink control information. In some embodiments, the apparatus includes a processor that: compares a current value of the indicator to a last known value of the indicator;

and, in response to the current value not matching the last known value: flushes a soft buffer; transfers a data packet corresponding to the indicator into the soft buffer; attempts to decode the data packet; in response to successfully decoding the data packet, performs an acknowledgment action; and, in response to unsuccessfully decoding the data packet, performs a non-acknowledgment action.

In one embodiment, a method for sidelink data packet acknowledgment includes receiving an indicator in sidelink control information. In certain embodiments, the method includes comparing a current value of the indicator to a last known value of the indicator. In some embodiments, the method includes, in response to the current value matching the last known value: flushing a soft buffer; transferring a data packet corresponding to the indicator into the soft buffer; attempting to decode the data packet; in response to successfully decoding the data packet, performing an acknowledgment action; and, in response to unsuccessfully decoding the data packet, performing a non-acknowledgment action.

An apparatus for sidelink data packet acknowledgment, in one embodiment, includes a receiver that receives an indicator in sidelink control information. In certain embodiments, the apparatus includes a processor that: compares a current value of the indicator to a last known value of the indicator; and, in response to the current value matching the last known value: flushes a soft buffer; transfers a data packet corresponding to the indicator into the soft buffer; attempts to decode the data packet; in response to successfully decoding the data packet, performs an acknowledgment action; and, in response to unsuccessfully decoding the data packet, performs a non-acknowledgment action.

In some embodiments, a method for sidelink data packet acknowledgment includes receiving an indicator in sidelink control information. In certain embodiments, the method includes comparing a current value of the indicator to a last known value of the indicator. In some embodiments, the method includes, in response to the current value matching the last known value: creating a copy of a data packet corresponding to the indicator; soft combining the data packet with data in a soft buffer, attempting to decode the copy of the data packet, or a combination thereof; and performing an acknowledgment action or a non-acknowledgment action based on the soft combining the data packet with data in the soft buffer, the attempting to decode the copy of the data packet, or the combination thereof.

An apparatus for sidelink data packet acknowledgment, in one embodiment, includes a receiver that receives an indicator in sidelink control information. In certain embodiments, the apparatus includes a processor that: compares a current value of the indicator to a last known value of the indicator; and, in response to the current value matching the last known value: creates a copy of a data packet corresponding to the indicator; soft combines the data packet with data in a soft buffer, attempts to decode the copy of the data packet, or a combination thereof; and performs an acknowledgment action or a non-acknowledgment action based on the soft combining the data packet with data in the soft buffer, the attempting to decode the copy of the data packet, or the combination thereof.

In various embodiments, a method for sidelink data packet acknowledgment includes determining whether a user equipment is outside of a minimum communication range. In certain embodiments, the method includes, in response to the user equipment being outside of the minimum communication range, transmitting a hybrid automatic repeat request acknowledgment in response to the user equipment successfully decoding a data packet and transmitting the hybrid automatic repeat request acknowledgment in response to the user equipment unsuccessfully decoding the data packet.

An apparatus for sidelink data packet acknowledgment, in one embodiment, includes a processor that determines whether a user equipment is outside of a minimum communication range. In certain embodiments, the apparatus includes a transmitter that, in response to the user equipment being outside of the minimum communication range, transmits a hybrid automatic repeat request acknowledgment in response to the user equipment successfully decoding a data packet and transmits the hybrid automatic repeat request acknowledgment in response to the user equipment unsuccessfully decoding the data packet.

In various embodiments, a method for sidelink data packet acknowledgment includes receiving a data packet. In certain embodiments, the method includes determining whether the data packet is a retransmission of a previous successfully decoded data packet. In some embodiments, the method includes, in response to the data packet being a retransmission of a previous successfully decoded data packet, performing an acknowledgment action.

An apparatus for sidelink data packet acknowledgment, in one embodiment, includes a receiver that receives a data packet. In certain embodiments, the apparatus includes a processor that: determines whether the data packet is a retransmission of a previous successfully decoded data packet; and, in response to the data packet being a retransmission of a previous successfully decoded data packet, performs an acknowledgment action.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
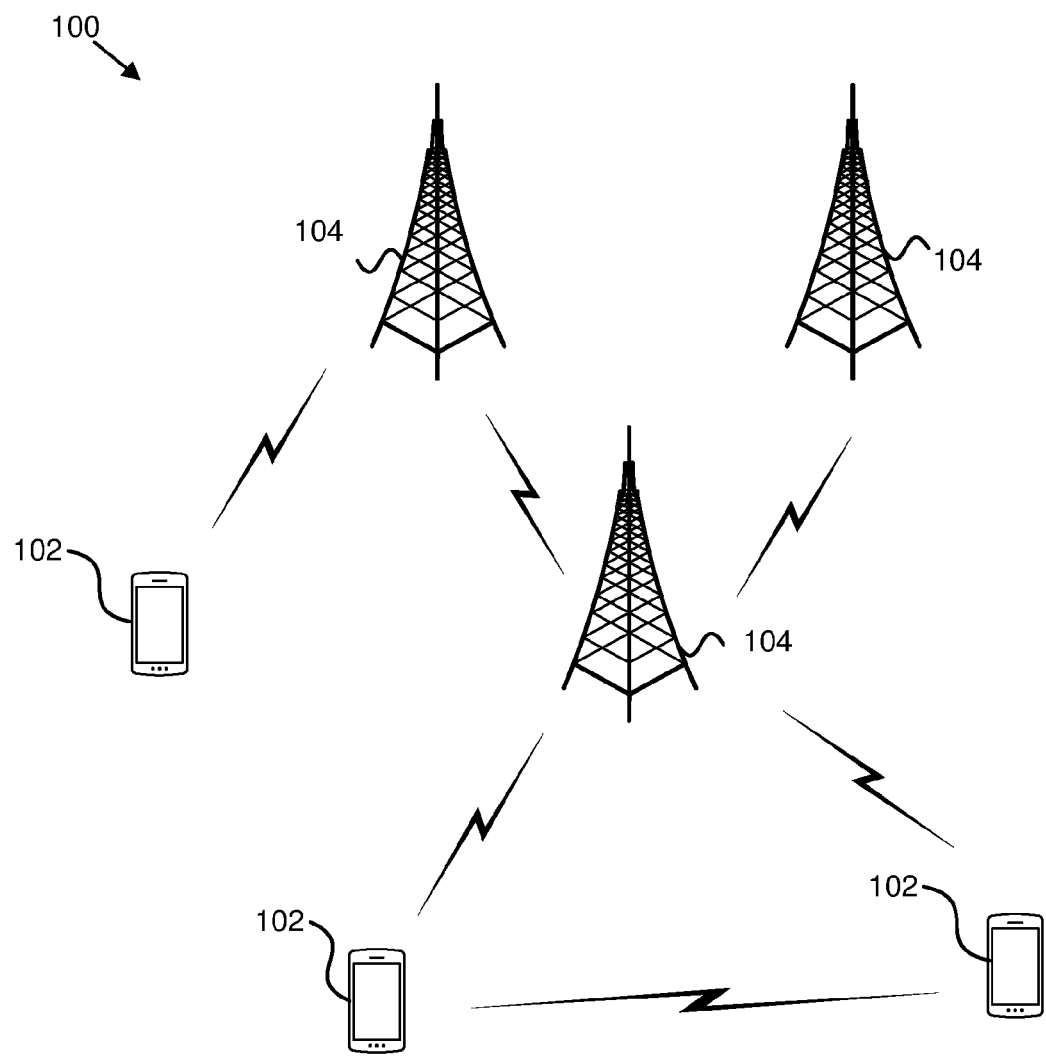
FIG. 1 is a schematic block diagram illustrating one embodiment of a wireless communication system for sidelink data packet acknowledgment.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for sidelink data packet acknowledgment. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In some embodiments, a remote unit 102 may receive an indicator in sidelink control information. In certain embodiments, the remote unit 102 may compare a current value of the indicator to a last known value of the indicator. In some embodiments, the remote unit 102 may, in response to the current value not matching the last known value: flush a soft buffer; transfer a data packet corresponding to the indicator into the soft buffer; attempt to decode the data packet; in response to successfully decoding the data packet, perform an acknowledgment action; and, in response to unsuccessfully decoding the data packet, perform a non-acknowledgment action. Accordingly, a remote unit 102 may be used for sidelink data packet acknowledgment.

In various embodiments, a remote unit 102 may receive an indicator in sidelink control information. In certain embodiments, the remote unit 102 may compare a current value of the indicator to a last known value of the indicator. In some embodiments, the remote unit 102 may, in response to the current value matching the last known value: flush a soft buffer; transfer a data packet corresponding to the indicator into the soft buffer; attempt to decode the data packet; in response to successfully decoding the data packet, perform an acknowledgment action; and, in response to unsuccessfully decoding the data packet, perform a non-acknowledgment action. Accordingly, a remote unit 102 may be used for sidelink data packet acknowledgment.

In some embodiments, a remote unit 102 may receive an indicator in sidelink control information. In certain embodiments, the remote unit 102 may compare a current value of the indicator to a last known value of the indicator. In some embodiments, the remote unit 102 may, in response to the current value matching the last known value: create a copy of a data packet corresponding to the indicator; soft combine the data packet with data in a soft buffer, attempt to decode the copy of the data packet, or a combination thereof; and perform an acknowledgment action or a non-acknowledgment action based on the soft combining the data packet with data in the soft buffer, the attempting to decode the copy of the data packet, or the combination thereof. Accordingly, a remote unit 102 may be used for sidelink data packet acknowledgment.

In various embodiments, a remote unit 102 may determine whether a user equipment is outside of a minimum communication range. In certain embodiments, the remote unit 102 may, in response to the user equipment being outside of the minimum communication range, transmit a hybrid automatic repeat request acknowledgment in response to the user equipment successfully decoding a data packet and transmit the hybrid automatic repeat request acknowledgment in response to the user equipment unsuccessfully decoding the data packet. Accordingly, a remote unit 102 may be used for sidelink data packet acknowledgment.

In some embodiments, a remote unit 102 may receive a data packet. In certain embodiments, the remote unit 102 may determine whether the data packet is a retransmission of a previous successfully decoded data packet. In some embodiments, the remote unit 102 may, in response to the data packet being a retransmission of a previous successfully decoded data packet, perform an acknowledgment action. Accordingly, a remote unit 102 may be used for sidelink data packet acknowledgment.

Figure 2:
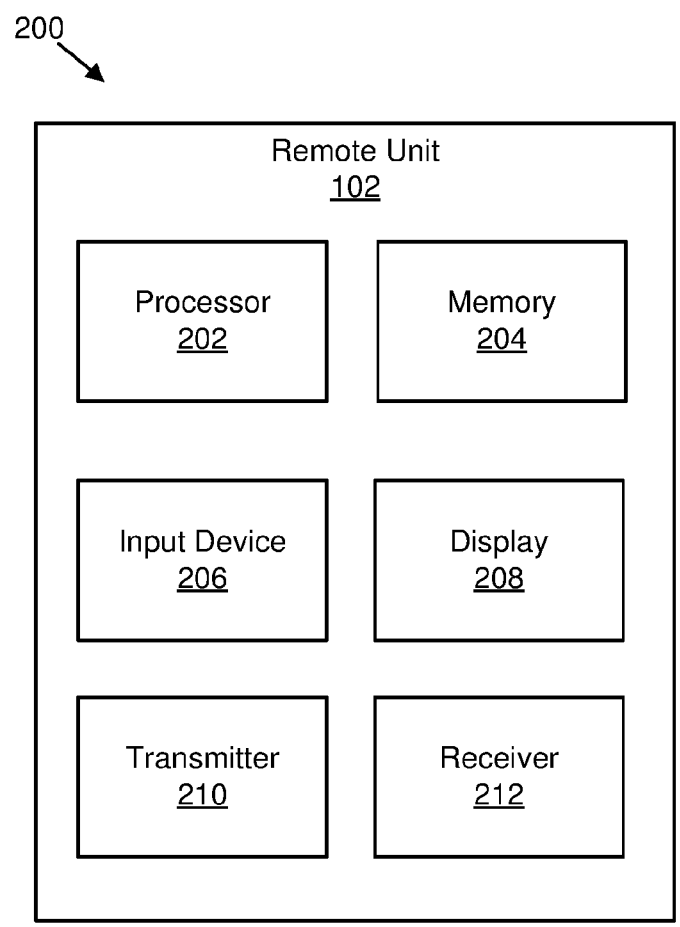
FIG. 2 is a schematic block diagram illustrating one embodiment of an apparatus that may be used for sidelink data packet acknowledgment.

FIG. 2 depicts one embodiment of an apparatus 200 that may be used for sidelink data packet acknowledgment. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In some embodiments, the processor 202 may: compare a current value of an indicator to a last known value of the indicator; and, in response to the current value not matching the last known value: flush a soft buffer; transfer a data packet corresponding to the indicator into the soft buffer; attempt to decode the data packet; in response to successfully decoding the data packet, perform an acknowledgment action; and, in response to unsuccessfully decoding the data packet, perform a non-acknowledgment action. In certain embodiments, the processor 202 may: compare a current value of an indicator to a last known value of the indicator; and, in response to the current value matching the last known value: flush a soft buffer; transfer a data packet corresponding to the indicator into the soft buffer; attempt to decode the data packet; in response to successfully decoding the data packet, perform an acknowledgment action; and, in response to unsuccessfully decoding the data packet, perform a non-acknowledgment action.

In various embodiments, the processor 202 may: compare a current value of the indicator to a last known value of the indicator; and, in response to the current value matching the last known value: create a copy of a data packet corresponding to the indicator; soft combine the data packet with data in a soft buffer, attempt to decode the copy of the data packet, or a combination thereof; and perform an acknowledgment action or a non-acknowledgment action based on the soft combining the data packet with data in the soft buffer, the attempting to decode the copy of the data packet, or the combination thereof. In some embodiments, the processor 202 determines whether a user equipment is outside of a minimum communication range. In certain embodiments, the processor 202: determines whether the data packet is a retransmission of a previous successfully decoded data packet; and, in response to the data packet being a retransmission of a previous successfully decoded data packet, performs an acknowledgment action. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the receiver 212 receives an indicator in sidelink control information. In certain embodiments, the transmitter 210, in response to the user equipment being outside of the minimum communication range, transmits a hybrid automatic repeat request acknowledgment in response to the user equipment successfully decoding a data packet and transmits the hybrid automatic repeat request acknowledgment in response to the user equipment unsuccessfully decoding the data packet. In various embodiments, the receiver 212 receives a data packet.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
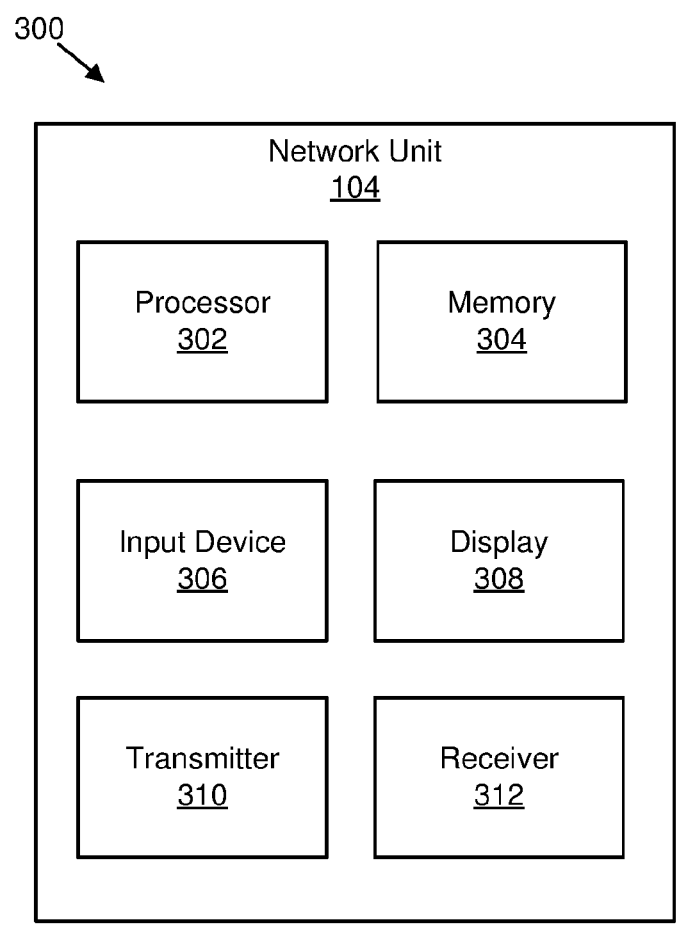
FIG. 3 is a schematic block diagram illustrating one embodiment of an apparatus that may be used for communication with a remote unit.

FIG. 3 depicts one embodiment of an apparatus 300 that may be used for communications with the remote unit 102. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 may transmit configuration information to the remote unit 102. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, such as in NR V2X communication, HARQ feedback may be used for groupcast and unicast communication to improve spectral efficiency. A UE providing feedback may make the feedback using one of the following two options: option 1) only NACK is transmitted and it is transmitted on a common feedback resource (In this option all receivers that fail to successfully decode a received PSSCH data packet send a HARQ NACK on the resource common to all the receivers. The HARQ NACK feedback may be SFN combined over the air); option 2) ACK and/or NACK are transmitted using UE specific resources (In this option every receiver that receives PSCCH (e.g., SCI) and attempts to decode a corresponding PSSCH data packet transmits HARQ ACK and/or NACK feedback in UE specific resources based on the results of decoding the data packet. The UE specific ACK/NACK feedback resources may include a time resource, a frequency resource, and/or a code resource).

In some embodiments, if a UE receives and decodes a data packet successfully it may be considered a UE-S, and if a UE does not receive and/or decode a data packet successfully it may be considered a UE-F.

Figure 4:
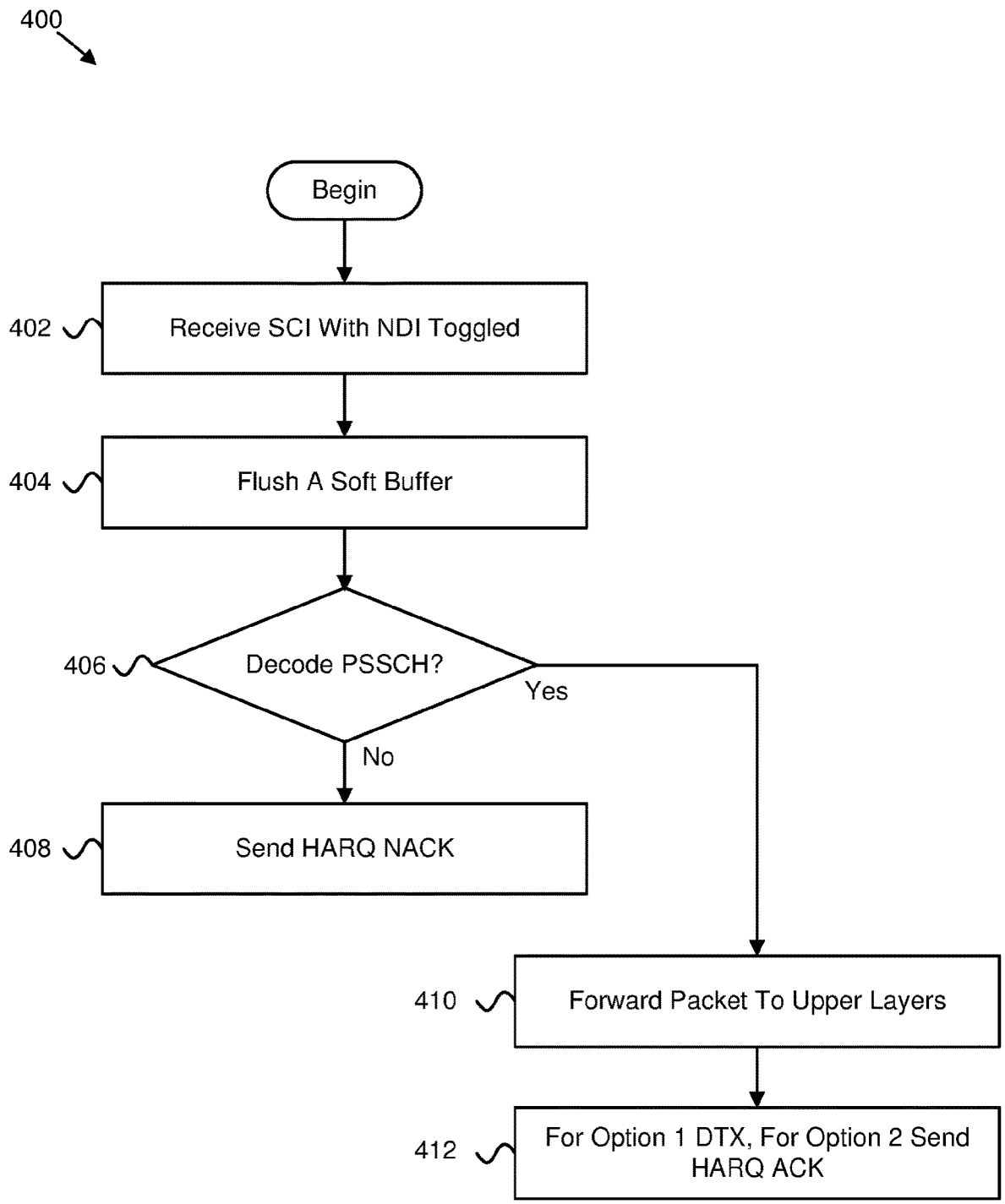
FIG. 4 is a schematic flow chart diagram illustrating one embodiment of a method for sidelink data packet acknowledgment.

FIG. 4 is a schematic flow chart diagram illustrating one embodiment of a method 400 for sidelink data packet acknowledgment. The method 400 includes a UE (e.g., remote unit 102) receiving 402 an SCI with an NDI toggled (e.g., toggled relative to a last known NDI value for the same HARQ process ID/source ID combination). The NDI may be indicated within the SCI. Toggled may refer to the NDI being a "1" if the last known NDI value was "0," or being a "0" if the last known NDI value was "1." The method 400 also includes flushing 404 (e.g., emptying, clearing) a soft buffer of the UE and transfer a data packet corresponding to the NDI into the soft buffer. The method 400 includes attempting 406 to decode the received data packet (e.g., PSSCH). In response to the attempt to decode the received data packet being unsuccessful, the method 400 sends 408 a HARQ NACK from the UE (e.g., using a common feedback resource, using a UE specific feedback resource). In response to the attempt to decode the received data packet being successful, the method 400 forwards 410 the data packet to upper (e.g., L2, MAC, RLC, PDCP) layers in the UE. The method 400 then sends 412 HARQ ACK from the UE according to option 2 described herein, or performs a DTX (e.g., not transmitting an ACK or NACK) at the UE according to option 1 described herein.

Figure 5:
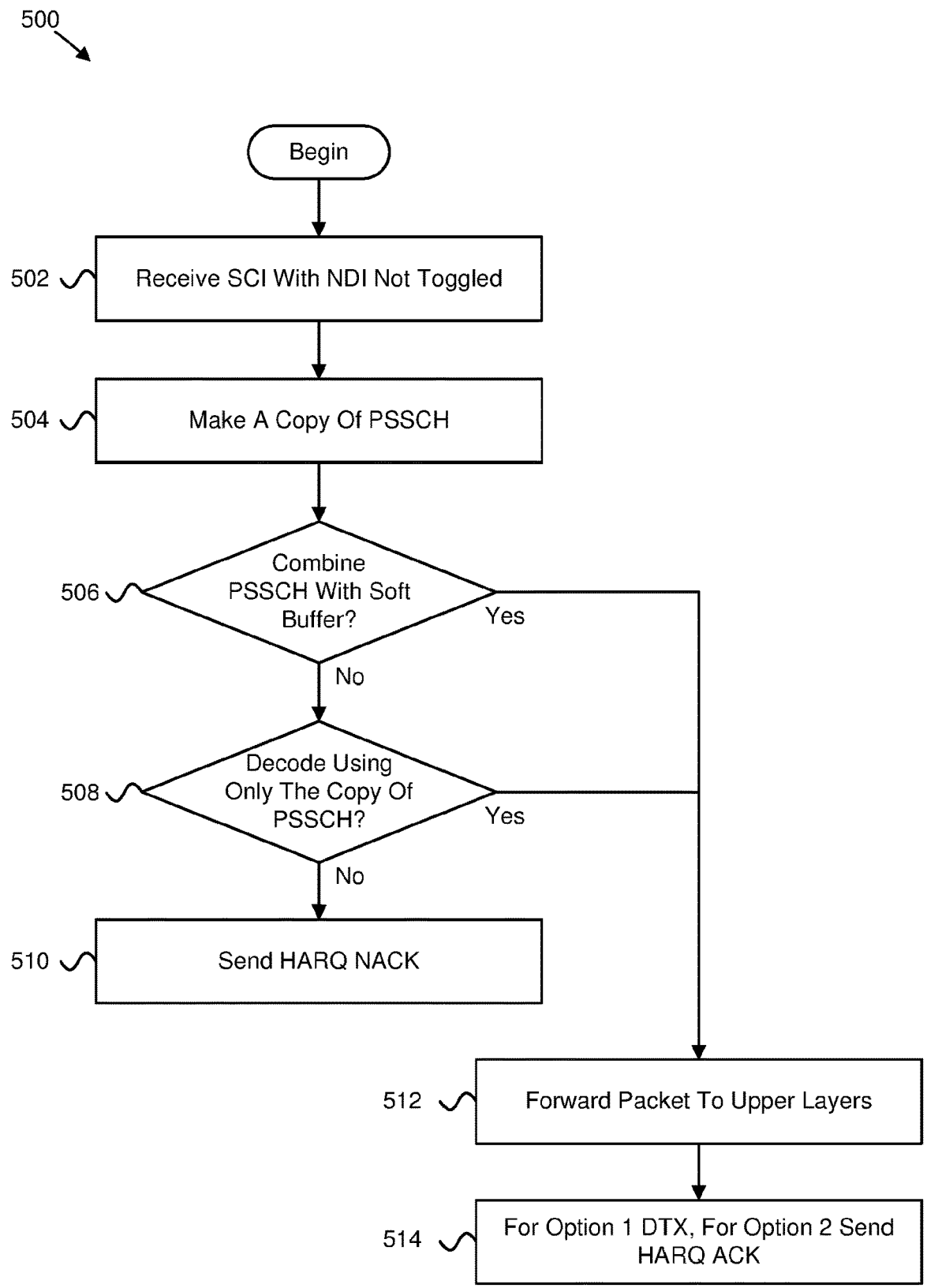
FIG. 5 is a schematic flow chart diagram illustrating another embodiment of a method for sidelink data packet acknowledgment.

FIG. 5 is a schematic flow chart diagram illustrating another embodiment of a method 500 for sidelink data packet acknowledgment. The method 500 includes a UE (e.g., remote unit 102) receiving 502 an SCI with an NDI not toggled (e.g., not toggled relative to a last known NDI value for the same HARQ process ID/source ID combination). The NDI may be indicated within the SCI. Not toggled may refer to the NDI being a "0" if the last known NDI value was "0," or being a "1" if the last known NDI value was "1." The method 500 also includes the UE making 504 a copy of a received data packet (e.g., PSSCH) that corresponds to the NDI. The method 500 may determine 506 whether the received data packet (e.g., PSSCH) can be combined with a soft buffer contents. As may be appreciated, the received data packet may be able to be combined with the soft buffer contents (e.g., via a soft combine) if the received data packet contains the same TB as the soft buffer. It should be noted that the received data packet may be considered to contain the same TB as the soft buffer even if they contain different redundancy versions of the same data.

If the received data packet cannot be combined with the soft buffer contents, the method 500 includes attempting 508 to decode only the copy of the received data packet (e.g., PSSCH). In response to the attempt to decode the copy of the received data packet being unsuccessful, the method 500 sends 510 a HARQ NACK from the UE (e.g., using a common feedback resource, using a UE specific feedback resource). In response to the attempt to decode the copy of the received data packet being successful and/or in response to the received data packet being able to be combined with the soft buffer contents, the method 500 forwards 512 the data packet to one or more upper layers in the UE, where PDCP will handle duplicated packets. The method 500 then sends 514 HARQ ACK from the UE according to option 2 described herein, or performs a DTX (e.g., not transmitting an ACK or NACK) at the UE according to option 1 described herein.

In some embodiments, the order of steps 506 and 508 may be reversed. In various embodiments, steps 506 and 508 may be executed concurrently, independently, and/or in parallel with one another. Table 1 illustrates various embodiments for the combination of steps 506 and 508.

TABLE 1

| Step 506 | Step 508 | Action |
| --- | --- | --- |
| Success | Success | Forward both decoded packets to upper layers, where PDCP will handle duplicated packets. |
| Success | Failure | Forward the successfully decoded packet to upper layers, where PDCP will handle duplicated packets. |
| Failure | Success | Forward the successfully decoded packet to upper layers, where PDCP will handle duplicated packets. |
| Failure | Failure | Send HARQ NACK regardless of option 1 or option 2. |

In some embodiments, in option 1 described herein, a transmitter UE may retransmit to a receiver UE until a maximum allowed retransmission count is reached (the value of the maximum allowed retransmission count may be specified, preconfigured, or configured by a gNB or by the transmitter UE), and in option 2 described herein, the transmitter UE may determine whether a particular receiver UE has previously indicated ACK for the same TB. If an ACK/NACK is received by the transmitter UE for a TB for which ACK was previously received, then the transmitter may ignore NACK feedback. In one embodiment, for option 2, the transmitter UE may store in L2 a HARQ ACK/NACK feedback for each member UE for previous transmissions to be able to determine if a retransmission needs to be made or if the NACK can be ignored since "the same receiver UE" had previously reported a HARQ ACK feedback for the same data packet. The storing of the HARQ feedback may need to be done while the data packet remains in transmission and/or retransmission (e.g., until the transmitter starts to transmit the next TB).

In some embodiments, a transmitter UE counts the number of HARQ responses and determines a number of DTX receiver UEs if not all receiver UEs responded for a first transmission. For a retransmission, the transmitter UE determines a number of DTX receiver UEs if not all receiver UEs that provided specific HARQ NACK in response to the first transmission responded with HARQ feedback. The transmitter must remember which UE provided NACK feedback in the previous transmission and/or retransmission to properly determine a number of DTX receiver UEs.

In another embodiment, irrespective of transmission or retransmission, the transmitter determines a number of DTX receiver UEs if not all receiver UEs responded (e.g., didn't send ACK or NACK).

If a DTX is detected, the transmitter retransmits until a maximum number of retransmissions is reached.

Figure 6:
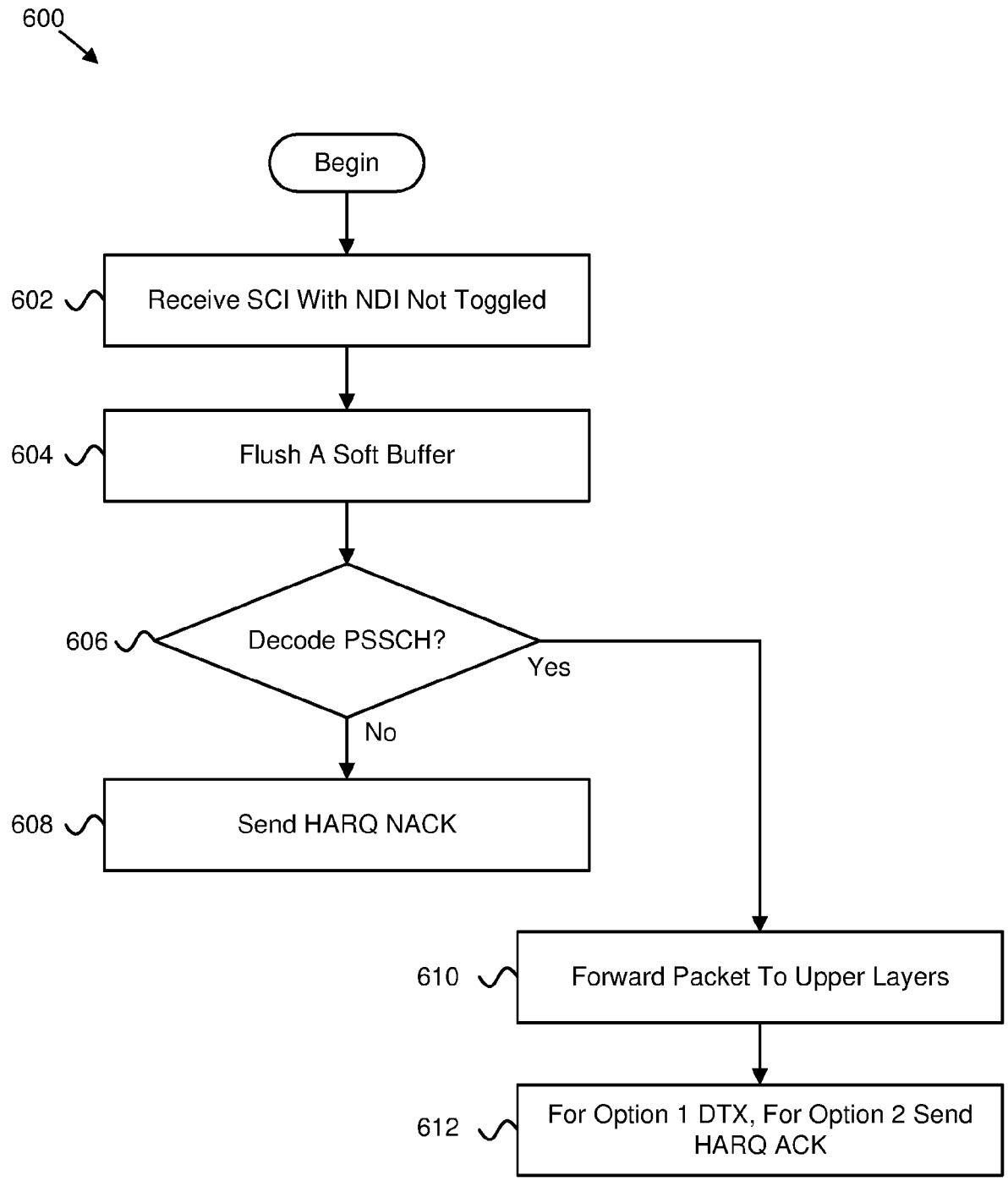
FIG. 6 is a schematic flow chart diagram illustrating a further embodiment of a method for sidelink data packet acknowledgment.

FIG. 6 is a schematic flow chart diagram illustrating a further embodiment of a method 600 for sidelink data packet acknowledgment. The method 600 includes a UE (e.g., remote unit 102) receiving 602 an SCI with an NDI not toggled (e.g., not toggled relative to a last known NDI value for the same HARQ process ID/source ID combination). The NDI may be indicated within the SCI. Not toggled may refer to the NDI being a "0" if the last known NDI value was "0," or being a "1" if the last known NDI value was "1." The method 600 also includes flushing 604 (e.g., emptying, clearing) a soft buffer of the UE and transfer a data packet corresponding to the NDI into the soft buffer. The method 600 includes attempting 606 to decode the received data packet (e.g., PSSCH, MAC TB). In response to the attempt to decode the received data packet being unsuccessful, the method 600 sends 608 a HARQ NACK from the UE (e.g., using a common feedback resource, using a UE specific feedback resource). In response to the attempt to decode the received data packet being successful, the method 600 forwards 610 the data packet to one or more upper layers (e.g., PDCP may discard this packet as a duplicate if a PDCP PDU with the same sequence number was already received) in the UE. The method 600 then sends 612 HARQ ACK from the UE according to option 2 described herein, or performs a DTX (e.g., not transmitting an ACK or NACK) via a physical layer of the UE according to option 1 described herein.

In some embodiments, a UE (e.g., receiver UE) may determine whether a data packet is a retransmission of a previous successfully decoded data packet. The UE may determine whether a data packet is a retransmission of a previous successfully decoded data packet based on: 1) an NDI not being toggled since successful decoding a data packet for the same HARQ ID/Source ID combination; or 2) a SN (e.g., of 3 bits to represent 0 through 7, any suitable number of bits) is used. The inclusion of the same SN (e.g., SN=3) compared with the previous reception in the SCI may indicate whether the data packet is a retransmission.

Based on the determination of whether a data packet is a retransmission of a previous successfully decoded data packet, two different UE behaviors may be: 1) the UE received a data packet successfully and any retransmissions of this data packet will be acknowledged with an ACK if option 2 feedback as described herein is used; 2) the UE received a data packet successfully and any retransmissions of this data packet will be acknowledged with a DTX (e.g., no transmission of HARQ feedback) for both option 1 and option 2 feedback mechanisms described herein.

In certain embodiments, a receiver UE, upon determining that it is outside of an MCR, may always transmit ACK feedback irrespective of actual failure status (e.g., ACK or NACK) of the data packet. This may enable the transmitter to not retransmit for a UE outside of the MCR. For example, this may help a transmitter UE in counting a number of HARQ feedbacks so that the transmitter UE may determine if there had been some DTX if the total number of receiver UEs in a group is known. In there is a DTX, the transmitter UE may choose to retransmit the data packet if a maximum number of allowed retransmission count has not been reached.

While some embodiments are described herein in relation to communication between a transmitter UE and one or more receiver UEs, the embodiments described herein may be applied to communications between a RAN node (e.g., gNB, eNB) and a UE, or a RAN node and another RAN node.

Various embodiments described herein may facilitate avoiding the possibility of a receiver UE mistaking a current data packet (e.g., PSSCH) transmission as a retransmission of an already successfully received data packet (if a receiver UE mistakes a current data packet transmission as an already successfully received data packet, the UE may not attempt to successfully receive the current data packet).

Moreover, as described herein, a UE may send HARQ feedback even if it had previously received and decoded the same data packet successfully. This may help a transmitter UE in counting a number of HARQ feedbacks, thereby the transmitter UE may determine if there had been some DTX if a total number of receiver UEs in the group is known. In there is a DTX, the transmitter UE may choose to retransmit the data packet if a maximum number of allowed retransmission count has not been reached.

In certain embodiments, two PSFCH resources or two indication methods are configured for a given HARQ-ACK feedback from a group of UEs. In such embodiments, if a first TB and a second TB have the same size, a first PSFCH resource or a first indication method may be used by one or more UEs in the group that have decoded the first TB successfully in a HARQ process, received the second TB with NDI not toggled in the HARQ process, and failed to decode the second TB. The first PSFCH resource or the first indication method may then accordingly carry NACK. Furthermore, in such embodiments, a second PSFCH resource or a second indication method may be used by all other UEs not using the first PSFCH resource or the first indication method for the HARQ-ACK feedback. In one example, UEs that have failed to decode the first TB in the HARQ process, received the second TB with NDI not toggled in the HARQ process, and failed to decode the second TB, use the second PSFCH resource or the second indication method for transmitting NACK in response to the decoding failure of the second TB. In another example, if a UE determines from the detected DCI formats that the first TB and the second TB have different sizes, the UE uses the second PSFCH resource or the second indication method for the HARQ-ACK feedback. The first TB and the second TB may or may not be the same.

In some embodiments, if a transmitter UE detects transmission on the first PSFCH resource (or the first indication method) and does not detect (e.g., detects DTX) transmission on the second PSFCH resource (or the second indication method), the transmitter UE may or may not retransmit the second TB. In one example, if the transmitter UE has already transmitted the second TB an X number of times to the group of UEs, the first TB and the second TB are likely to be the same for a UE that performs transmission on the first PSFCH resource (or first indication method) and, accordingly, the transmitter UE does not perform any further retransmission of the second TB. On the other hand, if the transmitter UE has transmitted the second TB only once or a few times, the first TB and the second TB are likely not to be the same for the UE that uses the first PSFCH resource for the HARQ-ACK feedback. Thus, the transmitter UE retransmits the second TB. If the transmitter UE detects transmission on the second PSFCH resource (or second indication method), the transmitter UE retransmits the second TB irrespective of detection on the first PSFCH resource (or first indication method). If the transmitter UE detects transmission neither on the first PSFCH resource (or first indication method) nor on the second PSFCH resource (or second indication method), the transmitter UE does not retransmit the second TB any further.

One benefit of the above mentioned embodiments (using two different PSFCH resources or two indication methods) may be to avoid another unnecessary retransmission due to a UE successfully decoding the first TB and transmitting the NACK for the second TB, where the second TB is a retransmission of the first TB. The probability that such will occur may be computed as follows:

$p$=a target BLER for a first transmission;
$N$=a number of UEs in a group;
Example 1: Probability (feedback of the first transmission is ACK for a first UE, feedback of at least one UE in the group is NACK)=$(1-p)*(1-(1-p)^{(N-1)})$;
Example 2: Probability (feedback of a second transmission is NACK for the first UE, feedback of all other UEs in the group are ACK)=$p*(1-p)^{(N-1)}$ (this may be approximated without considering the impact of soft combining the second transmission for some UEs);
Probability (Example 1 AND Example 2)=$p*(1-p)*(1-(1-p)^{(N-1)})*(1-p)^{(N-1)}$.

For $p=0.1$ and $N=10$, the resulting probability is 0.0214.
For $p=0.01$ and $N=10$, the resulting probability is 7.8213e−04.

In one example, a common time and frequency resource is allocated for the first and second PSFCHs, and two orthogonal sequences are assigned to the first and second PSFCHs, respectively. In one embodiment, the two orthogonal sequences are constructed from one base sequence that has a CAZAC property with two cyclic shift values.

In one embodiment, the transmitter UE for groupcast communication is configured with a maximum allowed number of transmissions of a given TB. The transmitter UE determines the retransmission of the second TB based on detection of the first and second PSFCH resources (or first and second indication methods) and the configured maximum allowed number of transmissions of the TB.

In other embodiments, if a HARQ-ACK feedback channel is shared by a group of UEs and only NACK is transmitted on the shared HARQ-ACK feedback channel, a target BLER for the first transmission of a data channel may be set to be much less than 10%, and a misdetection rate of a control channel carrying scheduling information of the data channel may be set to be lower than 1% for broadcast and/or groupcast transmission.

In certain embodiments, with a dedicated HARQ-ACK feedback channel resource for each UE, the retransmission of groupcast transmission may fall back to unicast if needed. For example, if a few UEs in a group transmit NACK, a transmitter UE performs retransmission in a unicast manner to the UEs that send NACK.

In other embodiments, instead of a 1-bit NDI, a multi N-bit (e.g., N=2 bit) NDI with modulo($2^N$)-incrementing (e.g., modulo-4) NDI may be used for successive new TB transmissions. For example, for a single TB transmission, instead of restricting to two states for NDI, a transmitter UE may use four states to distinguish successive new TBs for the same HARQ process.

TABLE 2

| TB# | 0 | 1 | 2 | 3 | 4 | 5 | 6 | 7 | 8 |
|---|---|---|---|---|---|---|---|---|---|
| 1-bit NDI | 0 | 1 | 0 | 1 | 0 | 1 | 0 | 1 | 0 |
| 2-bit NDI | 0 | 1 | 2 | 3 | 0 | 1 | 2 | 3 | 0 |

As illustrated in Table 2, instead of 1 missed DCI scheduling TB #1 causing the error event of mistaking the current new transmission (TB #2) as a retransmission (of TB #0), the 2-bit NDI may use control channels for 3 consecutive new TBs (TB #1, TB #2, TB #3) to be missed for the same error event. Unlike the process for different HARQ-IDs (e.g., that each may need to store data), the receiver UE may replace the data in the soft buffer (for the same HARQ process) whenever an NDI state is changed.

Figure 7:
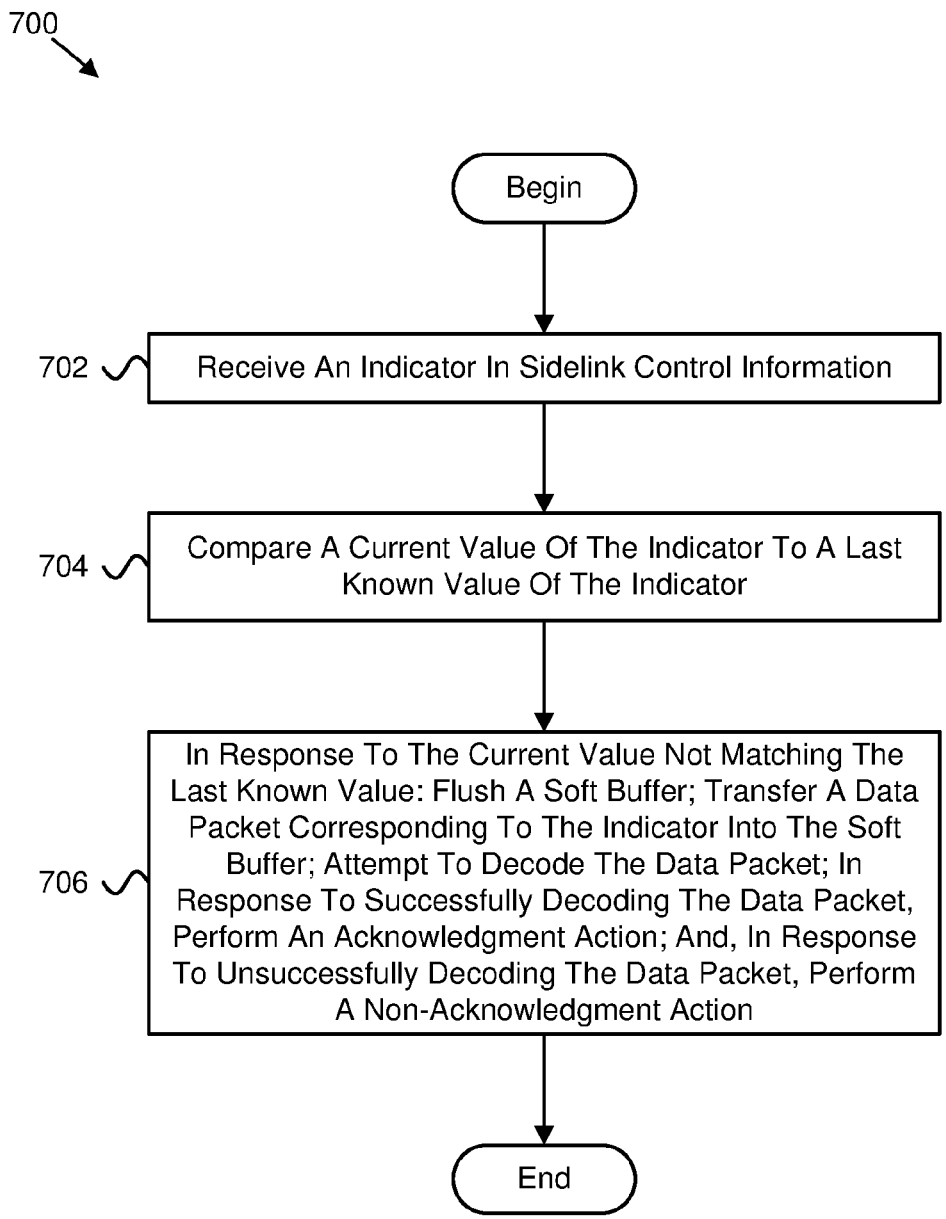
FIG. 7 is a schematic flow chart diagram illustrating yet another embodiment of a method for sidelink data packet acknowledgment.

FIG. 7 is a schematic flow chart diagram illustrating yet another embodiment of a method 700 for sidelink data packet acknowledgment. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702 an indicator in sidelink control information. In certain embodiments, the method 700 includes comparing 704 a current value of the indicator to a last known value of the indicator. In some embodiments, the method 700 includes, in response to the current value not matching the last known value: flushing 706 a soft buffer; transferring a data packet corresponding to the indicator into the soft buffer; attempting to decode the data packet; in response to successfully decoding the data packet, performing an acknowledgment action; and, in response to unsuccessfully decoding the data packet, performing a non-acknowledgment action.

In certain embodiments, the indicator comprises a new data indicator. In some embodiments, the indicator corresponds to a hybrid automatic repeat request identifier and a source identifier. In various embodiments, the data packet comprises data received in a physical sidelink shared channel.

In one embodiment, performing the acknowledgment action comprises transmitting a hybrid automatic repeat request acknowledgement. In certain embodiments, performing the acknowledgment action comprises not transmitting a hybrid automatic repeat request response. In some embodiments, performing the non-acknowledgement action comprises transmitting a hybrid automatic repeat request negative acknowledgement. In various embodiments, the method 700 further comprises, in response to successfully decoding the data packet, forwarding the data packet to an upper layer.

Figure 8:
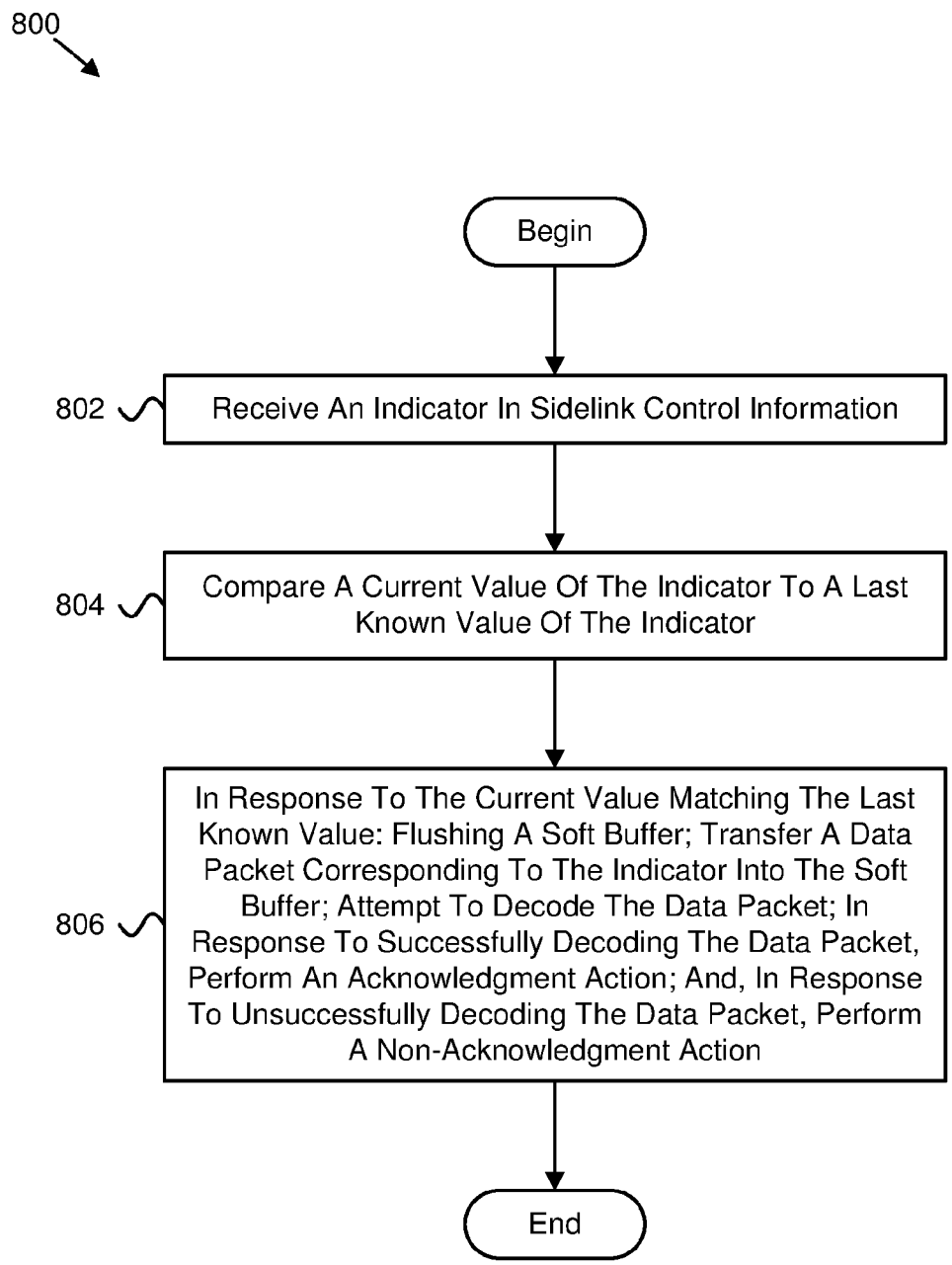
FIG. 8 is a schematic flow chart diagram illustrating yet a further embodiment of a method for sidelink data packet acknowledgment.

FIG. 8 is a schematic flow chart diagram illustrating yet a further embodiment of a method 800 for sidelink data packet acknowledgment. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include receiving 802 an indicator in sidelink control information. In certain embodiments, the method 800 includes comparing 804 a current value of the indicator to a last known value of the indicator. In some embodiments, the method 800 includes, in response to the current value matching the last known value: flushing 806 a soft buffer; transferring a data packet corresponding to the indicator into the soft buffer; attempting to decode the data packet; in response to successfully decoding the data packet, performing an acknowledgment action; and, in response to unsuccessfully decoding the data packet, performing a non-acknowledgment action.

In certain embodiments, the indicator comprises a new data indicator. In some embodiments, the indicator corresponds to a hybrid automatic repeat request identifier and a source identifier. In various embodiments, the data packet comprises data received in a physical sidelink shared channel.

In one embodiment, performing the acknowledgment action comprises transmitting a hybrid automatic repeat request acknowledgement. In certain embodiments, performing the acknowledgment action comprises not transmitting a hybrid automatic repeat request response. In some embodiments, performing the non-acknowledgement action comprises transmitting a hybrid automatic repeat request negative acknowledgement. In various embodiments, the method 800 further comprises, in response to successfully decoding the data packet, forwarding the data packet to an upper layer.

Figure 9:
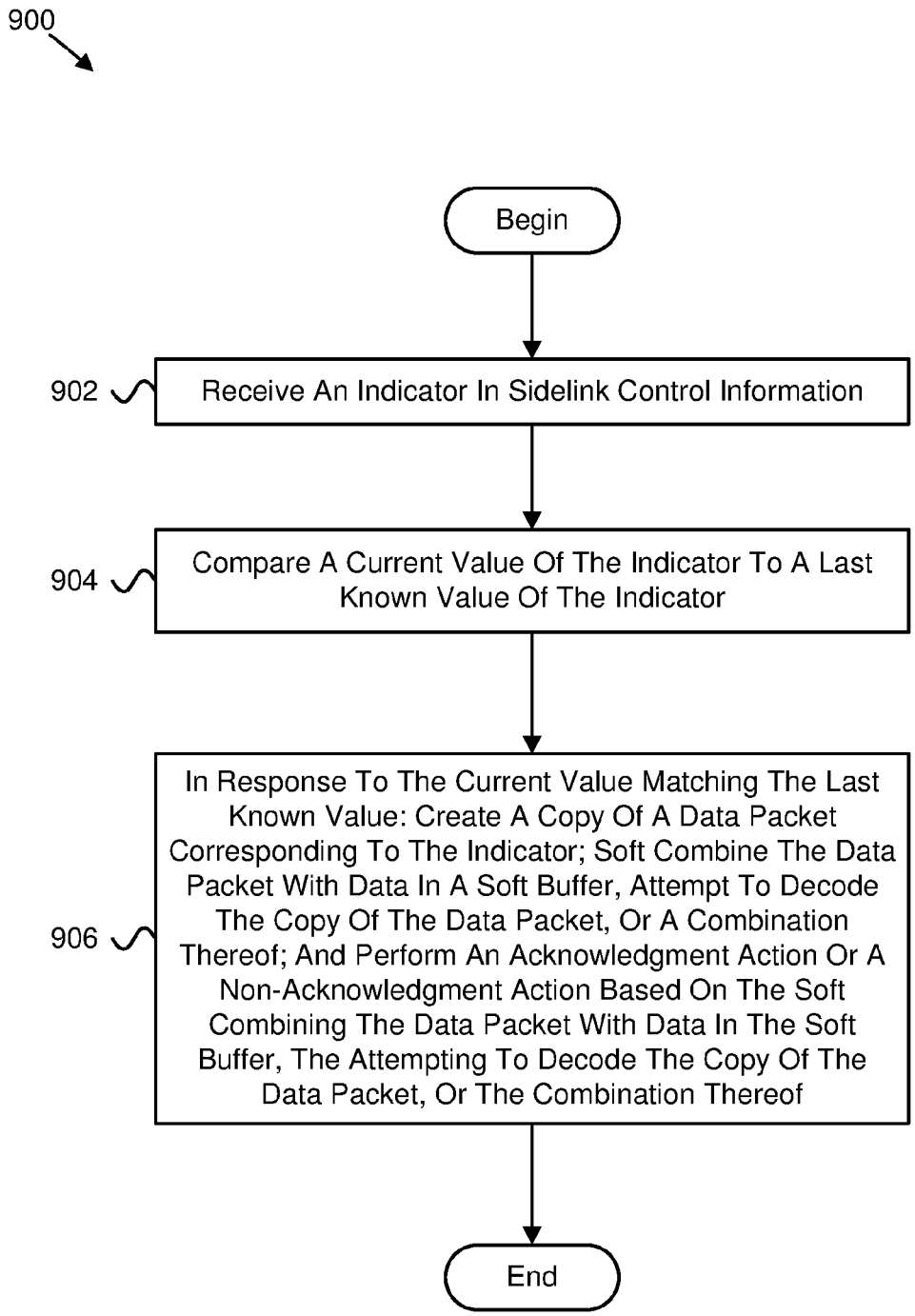
FIG. 9 is a schematic flow chart diagram illustrating an additional embodiment of a method for sidelink data packet acknowledgment.

FIG. 9 is a schematic flow chart diagram illustrating an additional embodiment of a method 900 for sidelink data packet acknowledgment. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902 an indicator in sidelink control information. In certain embodiments, the method 900 includes comparing 904 a current value of the indicator to a last known value of the indicator. In some embodiments, the method 900 includes, in response to the current value matching the last known value: creating 906 a copy of a data packet corresponding to the indicator; soft combining the data packet with data in a soft buffer, attempting to decode the copy of the data packet, or a combination thereof; and performing an acknowledgment action or a non-acknowledgment action based on the soft combining the data packet with data in the soft buffer, the attempting to decode the copy of the data packet, or the combination thereof.

In certain embodiments, the method 900 further comprises, in response to successfully soft combining the data packet with data in the soft buffer, performing the acknowledgment action. In some embodiments, the method 900 further comprises, in response to unsuccessfully soft combining the data packet with data in the soft buffer, attempting to decode the copy of the data packet. In various embodiments, the method 900 further comprises, in response to successfully decoding the copy of the data packet, performing the acknowledgment action.

In one embodiment, the method 900 further comprises, in response to unsuccessfully decoding the copy of the data packet, performing the non-acknowledgment action. In certain embodiments, the indicator comprises a new data indicator. In some embodiments, the indicator corresponds to a hybrid automatic repeat request identifier and a source identifier.

In various embodiments, the data packet comprises data received in a physical sidelink shared channel. In one embodiment, performing the acknowledgment action comprises transmitting a hybrid automatic repeat request acknowledgement. In certain embodiments, performing the acknowledgment action comprises not transmitting a hybrid automatic repeat request response.

In some embodiments, performing the non-acknowledgement action comprises transmitting a hybrid automatic repeat request negative acknowledgement. In various embodiments, the method 900 further comprises, in response to successfully soft combining the data packet with data in the soft buffer, forwarding the data packet to an upper layer. In one embodiment, the method 900 further comprises, in response to successfully decoding the copy of the data packet, forwarding the data packet to an upper layer.

Figure 10:
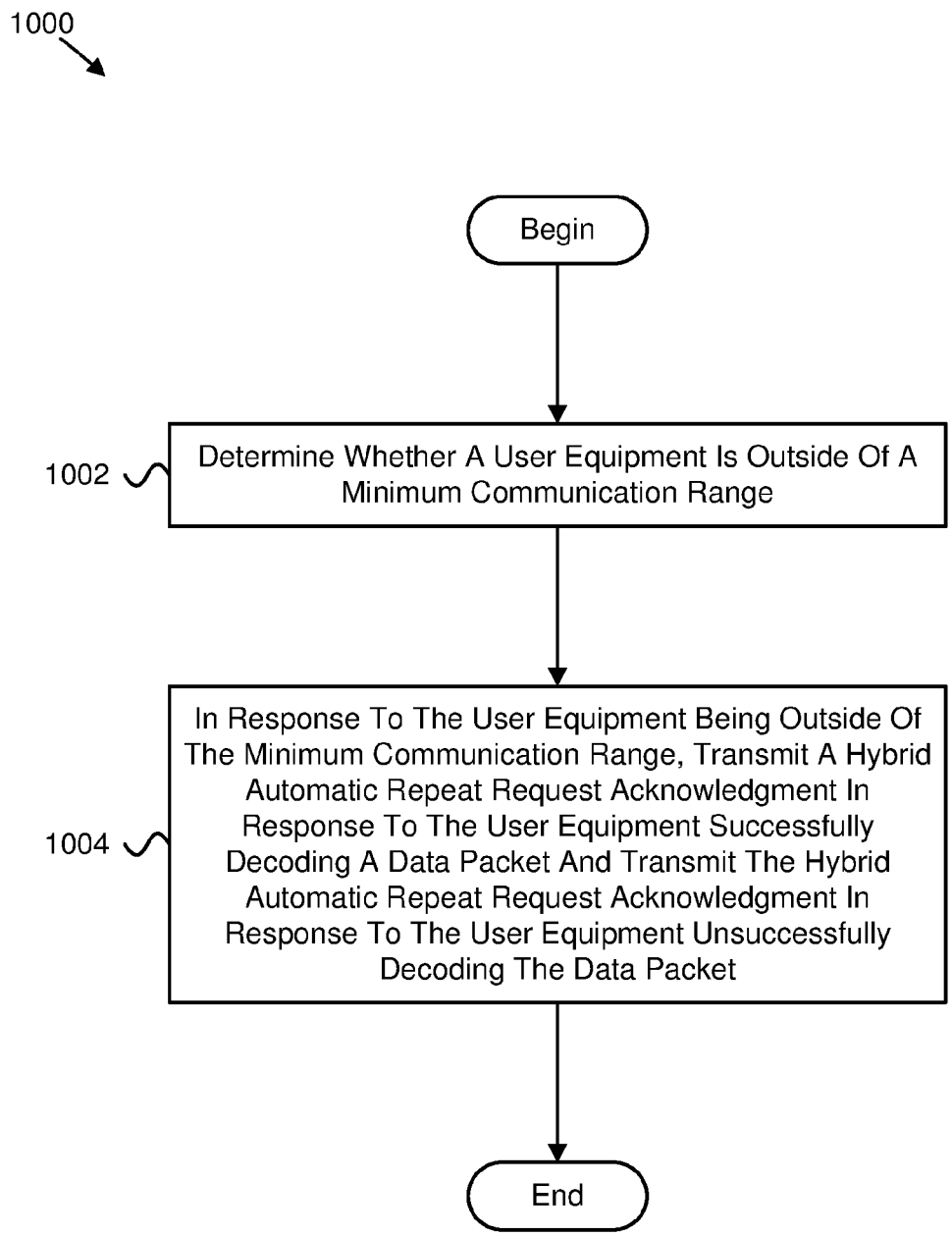
FIG. 10 is a schematic flow chart diagram illustrating still yet another embodiment of a method for sidelink data packet acknowledgment.

FIG. 10 is a schematic flow chart diagram illustrating still yet another embodiment of a method 1000 for sidelink data packet acknowledgment. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

The method 1000 may include determining 1002 whether a user equipment is outside of a minimum communication range. In certain embodiments, the method 1000 includes, in response to the user equipment being outside of the minimum communication range, transmitting 1004 a hybrid automatic repeat request acknowledgment in response to the user equipment successfully decoding a data packet and transmitting the hybrid automatic repeat request acknowledgment in response to the user equipment unsuccessfully decoding the data packet.

In certain embodiments, the method 1000 further comprises, in response to the user equipment being within the minimum communication range, transmitting the hybrid automatic repeat request acknowledgment in response to the user equipment successfully decoding the data packet. In some embodiments, the method 1000 further comprises, in response to the user equipment being within the minimum communication range, transmitting a hybrid automatic repeat request negative acknowledgment in response to the user equipment unsuccessfully decoding the data packet.

Figure 11:
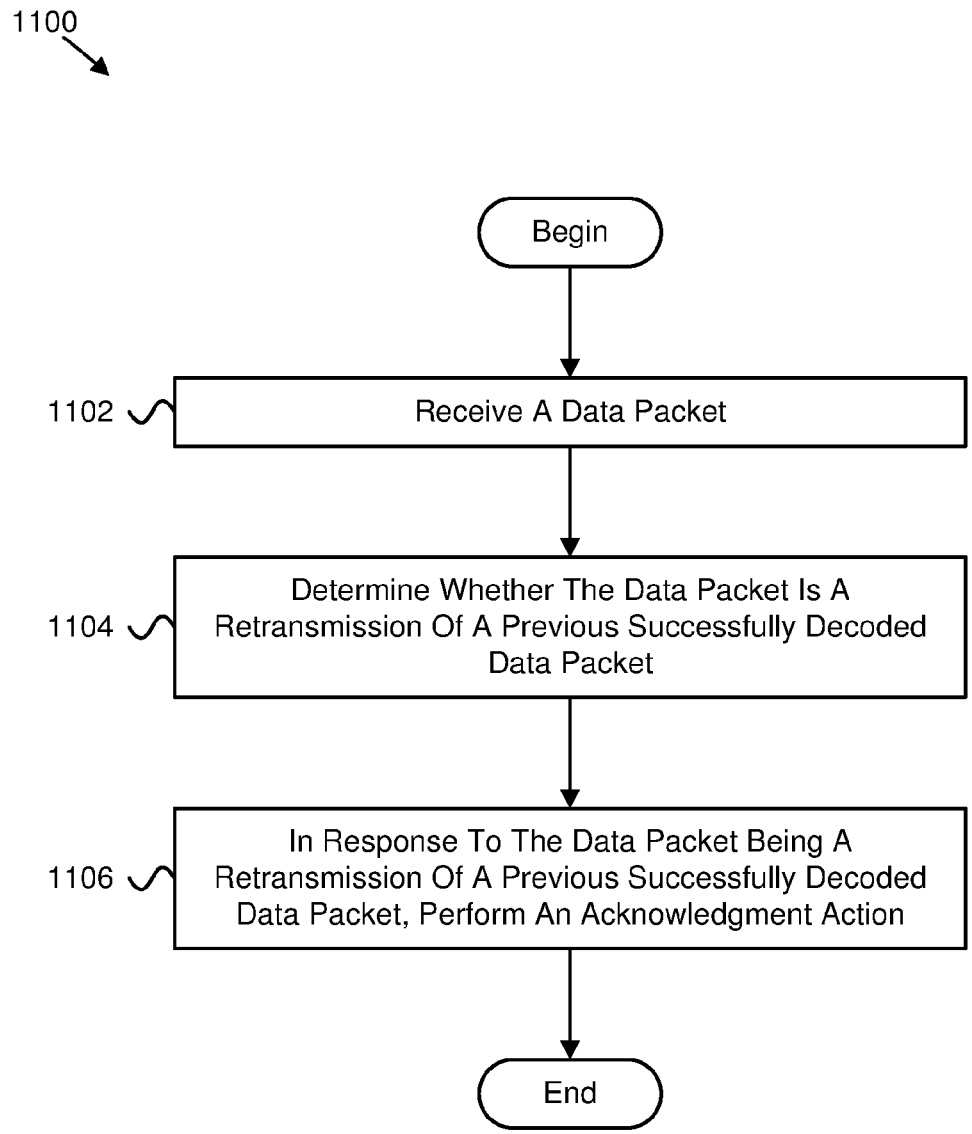
FIG. 11 is a schematic flow chart diagram illustrating still yet a further embodiment of a method for sidelink data packet acknowledgment.

FIG. 11 is a schematic flow chart diagram illustrating still yet a further embodiment of a method 1100 for sidelink data packet acknowledgment. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

The method 1100 may include receiving 1102 a data packet. In certain embodiments, the method 1100 includes determining 1104 whether the data packet is a retransmission of a previous successfully decoded data packet. In some embodiments, the method 1100 includes, in response to the data packet being a retransmission of a previous successfully decoded data packet, performing 1106 an acknowledgment action.

In certain embodiments, the data packet comprises data received in a physical sidelink shared channel. In some embodiments, determining whether the data packet is a retransmission of a previous successfully decoded data packet comprises determining whether the data packet is a retransmission of a previous successfully decoded data packet based on an indicator corresponding to the data packet.

In various embodiments, the data packet is a retransmission of a previous successfully decoded data packet if the indicator is not toggled since successfully decoding the previous successfully decoded data packet. In one embodiment, the indicator comprises a new data indicator. In certain embodiments, the indicator corresponds to a hybrid automatic repeat request identifier and a source identifier.

In some embodiments, the data packet and the previous successfully decoded data packet correspond to the same hybrid automatic repeat request identifier and source identifier. In various embodiments, determining whether the data packet is a retransmission of a previous successfully decoded data packet comprises determining whether the data packet is a retransmission of a previous successfully decoded data packet based on a sequence number corresponding to the data packet. In one embodiment, the data packet is a retransmission of a previous successfully decoded data packet if the sequence number corresponding to the data packet is the same as a sequence number corresponding to the previous successfully decoded data packet.

In certain embodiments, the data packet and the previous successfully decoded data packet correspond to the same hybrid automatic repeat request identifier and source identifier. In some embodiments, performing the acknowledgment action comprises transmitting a hybrid automatic repeat request acknowledgement. In various embodiments, performing the acknowledgment action comprises not transmitting a hybrid automatic repeat request response.

In one embodiment, a method comprises: receiving an indicator in sidelink control information; comparing a current value of the indicator to a last known value of the indicator; and in response to the current value not matching the last known value: flushing a soft buffer; transferring a data packet corresponding to the indicator into the soft buffer; attempting to decode the data packet; in response to successfully decoding the data packet, performing an acknowledgment action; and, in response to unsuccessfully decoding the data packet, performing a non-acknowledgment action.

In certain embodiments, the indicator comprises a new data indicator.

In some embodiments, the indicator corresponds to a hybrid automatic repeat request identifier and a source identifier.

In various embodiments, the data packet comprises data received in a physical sidelink shared channel.

In one embodiment, performing the acknowledgment action comprises transmitting a hybrid automatic repeat request acknowledgement.

In certain embodiments, performing the acknowledgment action comprises not transmitting a hybrid automatic repeat request response.

In some embodiments, performing the non-acknowledgement action comprises transmitting a hybrid automatic repeat request negative acknowledgement.

In various embodiments, the method further comprises, in response to successfully decoding the data packet, forwarding the data packet to an upper layer.

In one embodiment, an apparatus comprises: a receiver that receives an indicator in sidelink control information; and a processor that: compares a current value of the indicator to a last known value of the indicator; and in response to the current value not matching the last known value: flushes a soft buffer; transfers a data packet corresponding to the indicator into the soft buffer; attempts to decode the data packet; in response to successfully decoding the data packet, performs an acknowledgment action; and, in response to unsuccessfully decoding the data packet, performs a non-acknowledgment action.

In certain embodiments, the indicator comprises a new data indicator.

In some embodiments, the indicator corresponds to a hybrid automatic repeat request identifier and a source identifier.

In various embodiments, the data packet comprises data received in a physical sidelink shared channel.

In one embodiment, the apparatus further comprises a transmitter, wherein the processor performing the acknowledgment action comprises the transmitter transmitting a hybrid automatic repeat request acknowledgement.

In certain embodiments, the apparatus further comprises a transmitter, wherein the processor performing the acknowledgment action comprises the transmitter not transmitting a hybrid automatic repeat request response.

In some embodiments, the apparatus further comprises a transmitter, wherein the processor performing the non-acknowledgement action comprises the transmitter transmitting a hybrid automatic repeat request negative acknowledgement.

In various embodiments, in response to successfully decoding the data packet, the processor forwards the data packet to an upper layer.

In one embodiment, a method comprises: receiving an indicator in sidelink control information; comparing a current value of the indicator to a last known value of the indicator; and in response to the current value matching the last known value: flushing a soft buffer; transferring a data packet corresponding to the indicator into the soft buffer; attempting to decode the data packet; in response to successfully decoding the data packet, performing an acknowledgment action; and, in response to unsuccessfully decoding the data packet, performing a non-acknowledgment action.

In certain embodiments, the indicator comprises a new data indicator.

In some embodiments, the indicator corresponds to a hybrid automatic repeat request identifier and a source identifier.

In various embodiments, the data packet comprises data received in a physical sidelink shared channel.

In one embodiment, performing the acknowledgment action comprises transmitting a hybrid automatic repeat request acknowledgement.

In certain embodiments, performing the acknowledgment action comprises not transmitting a hybrid automatic repeat request response.

In some embodiments, performing the non-acknowledgement action comprises transmitting a hybrid automatic repeat request negative acknowledgement.

In various embodiments, the method further comprises, in response to successfully decoding the data packet, forwarding the data packet to an upper layer.

In one embodiment, an apparatus comprises: a receiver that receives an indicator in sidelink control information; and a processor that: compares a current value of the indicator to a last known value of the indicator; and in response to the current value matching the last known value: flushes a soft buffer; transfers a data packet corresponding to the indicator into the soft buffer; attempts to decode the data packet; in response to successfully decoding the data packet, performs an acknowledgment action; and, in response to unsuccessfully decoding the data packet, performs a non-acknowledgment action.

In certain embodiments, the indicator comprises a new data indicator.

In some embodiments, the indicator corresponds to a hybrid automatic repeat request identifier and a source identifier.

In various embodiments, the data packet comprises data received in a physical sidelink shared channel.

In one embodiment, the apparatus further comprises a transmitter, wherein the processor performing the acknowledgment action comprises the transmitter transmitting a hybrid automatic repeat request acknowledgement.

In certain embodiments, the apparatus further comprises a transmitter, wherein the processor performing the acknowledgment action comprises the transmitter not transmitting a hybrid automatic repeat request response.

In some embodiments, the apparatus further comprises a transmitter, wherein the processor performing the non-acknowledgement action comprises the transmitter transmitting a hybrid automatic repeat request negative acknowledgement.

In various embodiments, in response to successfully decoding the data packet, the processor forwards the data packet to an upper layer.

In one embodiment, a method comprises: receiving an indicator in sidelink control information; comparing a current value of the indicator to a last known value of the indicator; and in response to the current value matching the last known value: creating a copy of a data packet corresponding to the indicator; soft combining the data packet with data in a soft buffer, attempting to decode the copy of the data packet, or a combination thereof; and performing an acknowledgment action or a non-acknowledgment action based on the soft combining the data packet with data in the soft buffer, the attempting to decode the copy of the data packet, or the combination thereof.

In certain embodiments, the method further comprises, in response to successfully soft combining the data packet with data in the soft buffer, performing the acknowledgment action.

In some embodiments, the method further comprises, in response to unsuccessfully soft combining the data packet with data in the soft buffer, attempting to decode the copy of the data packet.

In various embodiments, the method further comprises, in response to successfully decoding the copy of the data packet, performing the acknowledgment action.

In one embodiment, the method further comprises, in response to unsuccessfully decoding the copy of the data packet, performing the non-acknowledgment action.

In certain embodiments, the indicator comprises a new data indicator.

In some embodiments, the indicator corresponds to a hybrid automatic repeat request identifier and a source identifier.

In various embodiments, the data packet comprises data received in a physical sidelink shared channel.

In one embodiment, performing the acknowledgment action comprises transmitting a hybrid automatic repeat request acknowledgement.

In certain embodiments, performing the acknowledgment action comprises not transmitting a hybrid automatic repeat request response.

In some embodiments, performing the non-acknowledgement action comprises transmitting a hybrid automatic repeat request negative acknowledgement.

In various embodiments, the method further comprises, in response to successfully soft combining the data packet with data in the soft buffer, forwarding the data packet to an upper layer.

In one embodiment, the method further comprises, in response to successfully decoding the copy of the data packet, forwarding the data packet to an upper layer.

In one embodiment, an apparatus comprises: a receiver that receives an indicator in sidelink control information; and a processor that: compares a current value of the indicator to a last known value of the indicator; and in response to the current value matching the last known value: creates a copy of a data packet corresponding to the indicator; soft combines the data packet with data in a soft buffer, attempts to decode the copy of the data packet, or a combination thereof; and performs an acknowledgment action or a non-acknowledgment action based on the soft combining the data packet with data in the soft buffer, the attempting to decode the copy of the data packet, or the combination thereof.

In certain embodiments, in response to successfully soft combining the data packet with data in the soft buffer, the processor performs the acknowledgment action.

In some embodiments, in response to unsuccessfully soft combining the data packet with data in the soft buffer, the processor attempts to decode the copy of the data packet.

In various embodiments, in response to successfully decoding the copy of the data packet, the processor performs the acknowledgment action.

In one embodiment, in response to unsuccessfully decoding the copy of the data packet, the processor performs the non-acknowledgment action.

In certain embodiments, the indicator comprises a new data indicator.

In some embodiments, the indicator corresponds to a hybrid automatic repeat request identifier and a source identifier.

In various embodiments, the data packet comprises data received in a physical sidelink shared channel.

In one embodiment, the apparatus further comprises a transmitter, wherein the processor performing the acknowledgment action comprises the transmitter transmitting a hybrid automatic repeat request acknowledgement.

In certain embodiments, the apparatus further comprises a transmitter, wherein the processor performing the acknowledgment action comprises the transmitter not transmitting a hybrid automatic repeat request response.

In some embodiments, the apparatus further comprises a transmitter, wherein the processor performing the non-acknowledgement action comprises the transmitter transmitting a hybrid automatic repeat request negative acknowledgement.

In various embodiments, in response to successfully soft combining the data packet with data in the soft buffer, the processor forwards the data packet to an upper layer.

In one embodiment, in response to successfully decoding the copy of the data packet, the processor forwards the data packet to an upper layer.

In one embodiment, a method comprises: determining whether a user equipment is outside of a minimum communication range; and in response to the user equipment being outside of the minimum communication range, transmitting a hybrid automatic repeat request acknowledgment in response to the user equipment successfully decoding a data packet and transmitting the hybrid automatic repeat request acknowledgment in response to the user equipment unsuccessfully decoding the data packet.

In certain embodiments, the method further comprises, in response to the user equipment being within the minimum communication range, transmitting the hybrid automatic repeat request acknowledgment in response to the user equipment successfully decoding the data packet.

In some embodiments, the method further comprises, in response to the user equipment being within the minimum communication range, transmitting a hybrid automatic repeat request negative acknowledgment in response to the user equipment unsuccessfully decoding the data packet.

In one embodiment, an apparatus comprises: a processor that determines whether a user equipment is outside of a minimum communication range; and a transmitter that, in response to the user equipment being outside of the minimum communication range, transmits a hybrid automatic repeat request acknowledgment in response to the user equipment successfully decoding a data packet and transmits the hybrid automatic repeat request acknowledgment in response to the user equipment unsuccessfully decoding the data packet.

In certain embodiments, in response to the user equipment being within the minimum communication range, the transmitter transmits the hybrid automatic repeat request acknowledgment in response to the user equipment successfully decoding the data packet.

In some embodiments, in response to the user equipment being within the minimum communication range, the transmitter transmits a hybrid automatic repeat request negative acknowledgment in response to the user equipment unsuccessfully decoding the data packet.

In one embodiment, a method comprises: receiving a data packet; determining whether the data packet is a retransmission of a previous successfully decoded data packet; and, in response to the data packet being a retransmission of a previous successfully decoded data packet, performing an acknowledgment action.

In certain embodiments, the data packet comprises data received in a physical sidelink shared channel.

In some embodiments, determining whether the data packet is a retransmission of a previous successfully decoded data packet comprises determining whether the data packet is a retransmission of a previous successfully decoded data packet based on an indicator corresponding to the data packet.

In various embodiments, the data packet is a retransmission of a previous successfully decoded data packet if the indicator is not toggled since successfully decoding the previous successfully decoded data packet.

In one embodiment, the indicator comprises a new data indicator.

In certain embodiments, the indicator corresponds to a hybrid automatic repeat request identifier and a source identifier.

In some embodiments, the data packet and the previous successfully decoded data packet correspond to the same hybrid automatic repeat request identifier and source identifier.

In various embodiments, determining whether the data packet is a retransmission of a previous successfully decoded data packet comprises determining whether the data packet is a retransmission of a previous successfully decoded data packet based on a sequence number corresponding to the data packet.

In one embodiment, the data packet is a retransmission of a previous successfully decoded data packet if the sequence number corresponding to the data packet is the same as a sequence number corresponding to the previous successfully decoded data packet.

In certain embodiments, the data packet and the previous successfully decoded data packet correspond to the same hybrid automatic repeat request identifier and source identifier.

In some embodiments, performing the acknowledgment action comprises transmitting a hybrid automatic repeat request acknowledgement.

In various embodiments, performing the acknowledgment action comprises not transmitting a hybrid automatic repeat request response.

In one embodiment, an apparatus comprises: a receiver that receives a data packet; and a processor that: determines whether the data packet is a retransmission of a previous successfully decoded data packet; and, in response to the data packet being a retransmission of a previous successfully decoded data packet, performs an acknowledgment action.

In certain embodiments, the data packet comprises data received in a physical sidelink shared channel.

In some embodiments, the processor determining whether the data packet is a retransmission of a previous successfully decoded data packet comprises the processor determining whether the data packet is a retransmission of a previous successfully decoded data packet based on an indicator corresponding to the data packet.

In various embodiments, the data packet is a retransmission of a previous successfully decoded data packet if the indicator is not toggled since successfully decoding the previous successfully decoded data packet.

In one embodiment, the indicator comprises a new data indicator.

In certain embodiments, the indicator corresponds to a hybrid automatic repeat request identifier and a source identifier.

In some embodiments, the data packet and the previous successfully decoded data packet correspond to the same hybrid automatic repeat request identifier and source identifier.

In various embodiments, the processor determining whether the data packet is a retransmission of a previous successfully decoded data packet comprises the processor determining whether the data packet is a retransmission of a previous successfully decoded data packet based on a sequence number corresponding to the data packet.

In one embodiment, the data packet is a retransmission of a previous successfully decoded data packet if the sequence number corresponding to the data packet is the same as a sequence number corresponding to the previous successfully decoded data packet.

In certain embodiments, the data packet and the previous successfully decoded data packet correspond to the same hybrid automatic repeat request identifier and source identifier.

In some embodiments, the apparatus further comprises a transmitter, wherein the processor performing the acknowledgment action comprises the transmitter transmitting a hybrid automatic repeat request acknowledgement.

In various embodiments, the apparatus further comprises a transmitter, wherein the processor performing the acknowledgment action comprises the transmitter not transmitting a hybrid automatic repeat request response.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   receiving a data packet from a base station;
   receiving a sidelink control information (SCI) corresponding to the received data packet, the SCI comprising at least one of a new data indicator (NDI) and a sequence number of the received data packet;
   determining whether the received data packet is a retransmission of a previous successfully decoded data packet based on at least one of:
      the NDI of the received data packet being toggled or not toggled; or
      the sequence number of the received data packet matching or not matching a corresponding sequence number associated with the previous successfully decoded data packet;
   in response to the received data packet being a retransmission of a previous successfully decoded data packet, transmitting, to the base station, feedback that indicates to inhibit retransmission of the received data packet, wherein the NDI being toggled comprises a change in a value of the NDI with respect to a previous value of the NDI; and
   emptying a soft buffer of the UE in response to the NDI being toggled.

2. The method of claim 1, wherein the received data packet comprises data received in a physical sidelink shared channel (PSSCH).

3. The method of claim 1, wherein the received data packet is the retransmission of the previous successfully decoded data packet if the NDI is not toggled.

4. The method of claim 1, wherein determining whether the received data packet is a retransmission of a previous successfully decoded data packet is further based at least in part on a hybrid automatic repeat request (HARQ) identifier associated with the received data packet.

5. The method of claim 4, wherein the NDI not being toggled indicates that the received data packet and the previous successfully decoded data packet correspond to a same HARQ identifier.

6. The method of claim 1, wherein transmitting the feedback comprises transmitting a hybrid automatic repeat request (HARQ) acknowledgement.

7. The method of claim 1, wherein transmitting the feedback comprises not transmitting a hybrid automatic repeat request (HARQ) response.

8. A user equipment (UE), comprising:
   at least one memory; and
   at least one processor coupled with the at least one memory and configured to cause the UE to:
      receive a data packet from a base station;
      receive a sidelink control information (SCI) corresponding to the received data packet, the SCI comprising at least one of a new data indicator (NDI) and a sequence number of the received data packet;
      determine whether the received data packet is a retransmission of a previous successfully decoded data packet based on at least one of:
         the NDI of the received data packet being toggled or not toggled; or the sequence number of the received data packet matching or not matching a corresponding sequence number associated with the previous successfully decoded data packet;

in response to the received data packet being a retransmission of a previous successfully decoded data packet, transmit, to the base station, feedback that indicates to inhibit retransmission of the received data packet, wherein the NDI being toggled comprises a change in a value of the NDI with respect to a previous value of the NDI; and empty a soft buffer of the UE in response to the NDI being toggled.

9. The UE of claim 8, wherein the received data packet comprises data received in a physical sidelink shared channel (PSSCH).

10. The UE of claim 8, wherein the received data packet is the retransmission of the previous successfully decoded data packet if the NDI is not toggled.

11. The UE of claim 8, wherein the at least one processor is further configured to cause the UE to make a copy of the received data packet in response to the NDI not being toggled.

12. The UE of claim 8, wherein the at least one processor is further configured to cause the UE to transfer the received data packet into the emptied soft buffer of the UE.

13. The UE of claim 12, wherein the at least one processor is further configured to cause the UE to attempt to decode the received data packet.

14. The UE of claim 13, wherein the at least one processor is further configured to cause the UE to, in response to successfully decoding the received data packet, perform an acknowledgement action.

15. The UE of claim 13, wherein the at least one processor is further configured to cause the UE to, in response to unsuccessfully decoding the received data packet, perform a non-acknowledgement action.

16. The UE of claim 13, wherein the at least one processor is further configured to cause the UE to, in response to successfully decoding the received data packet, forward the received data packet to a higher layer within the UE.

17. A method performed by a base station, the method comprising:

transmitting a data packet to a user equipment (UE), wherein sidelink control information (SCI) corresponds to the transmitted data packet, wherein the SCI comprises at least one of a new data indicator (NDI) and a sequence number of the transmitted data packet, wherein the transmitted data packet is a retransmission of a previous successfully decoded data packet based on at least one of: the NDI of the transmitted data packet being toggled or not toggled, or whether the sequence number of the transmitted data packet matches a corresponding sequence number associated with the previous successfully decoded data packet; and receiving, from the UE, feedback that indicates to inhibit retransmission of the transmitted data packet, wherein the feedback is based at least in part on the transmitted data packet being a retransmission of a previous successfully decoded data packet, wherein the NDI being toggled comprises a change in a value of the NDI with respect to a previous value of the NDI, and wherein the NDI triggers a soft buffer to be emptied in response to the NDI being toggled.

18. A base station, comprising:

at least one memory; and at least one processor coupled with the at least one memory and configured to cause the base station to:

transmit a data packet to a user equipment (UE), wherein sidelink control information (SCI) corresponds to the transmitted data packet, wherein the SCI comprises at least one of a new data indicator (NDI) and a sequence number of the transmitted data packet, wherein the transmitted data packet is a retransmission of a previous successfully decoded data packet based on at least one of: the NDI of the transmitted data packet being toggled or not toggled, or whether the sequence number of the transmitted data packet matches a corresponding sequence number associated with the previous successfully decoded data packet; and receive, from the UE, feedback that indicates to inhibit retransmission of the transmitted data packet, wherein the feedback is based at least in part on the transmitted data packet being a retransmission of a previous successfully decoded data packet, wherein the NDI being toggled comprises a change in a value of the NDI with respect to a previous value of the NDI, and wherein the NDI triggers a soft buffer to be emptied in response to the NDI being toggled.

* * * * *